United States Patent Office 3,268,590
Patented August 23, 1966

3,268,590
PROCESS FOR PREPARING ALDEHYDES
AND KETONES
Ulrich Schwenk and Günter Mau, Frankfurt am Main,
Germany, assignors to Farbwerke Hoechst Aktienge-
sellschaft vormals Meister Lucius & Brüning, Frank-
furt am Main, Germany, a corporation of Germany
No Drawing. Filed May 3, 1962, Ser. No. 192,096
Claims priority, application Germany, May 6, 1961,
F 33,869
10 Claims. (Cl. 260—597)

The present invention relates to a process for preparing aldehydes and ketones.

It has already been proposed to oxidize olefins in the liquid or gaseous phase to aldehydes, ketones or carboxylic acids by reacting the olefins with oxygen or with oxygen-containing gases at temperatures of up to 250° C., in the presence of water, noble metal halides capable of forming addition compounds or complex salts with the olefin, and redox systems. The aqueous reaction product formed is then distilled in a column with separation of the distillate into a product containing the aldehydes and ketones, which leaves the column at its top, and a product containing the carboxylic acid and water, which accumulates at the lower end of the column. According to a modified form of the aforesaid process, the olefin is reacted with the catalyst in a first stage in the absence of oxygen and the catalyst, which is free of insoluble precipitates, is regenerated in a second stage in the absence of the olefin with oxygen or gases containing elementary oxygen. In this process, which usually is carried out continuously, insoluble substances generally precipitate after a certain time, which precipitation is undesired and involves a constantly increasing deterioration of the efficiency of the catalyst. For this reason it has inter alia been proposed to regenerate the catalyst from time to time by a thermal treatment, or to carry out the regeneration continuously by continuously conducting a certain portion of the catalyst liquid into a branch cycle, freeing it from any organic precipitates admixed with it by a thermal treatment in the presence of mineral acid, and continuously returning the catalyst liquid to the reaction zone.

The oxidation of olefins with oxygen or gases containing oxygen can be conducted in such a manner that predominantly carbonyl compounds, namely aldehydes and ketones, and only a minor portion of carboxylic acids are obtained. In this case the relatively small quantities of carboxylic acids have to be regarded as by-products.

No matter according to which of the various possible ways the oxidation of olefins with oxygen or oxygen-containing gases is carried out, halogenated organic products, the halogen atoms of which come from the metal salts used and in most cases are chlorine atoms and in some cases bromine atoms, form as further by-products. In the oxidation of ethylene and propylene there may form, for example, halogen-containing by-products such, for example, as monochloracetaldehyde, dichloracetaldehyde, chlorohydrin, methyl chloride, methylene chloride, chloroform, monochloracetone, dichloracetone, ethyl chloride or the corresponding bromine compounds.

Whether the oxidation of the olefin is carried out in a single stage as described above, or in a first oxidation stage and a second regeneration stage, the halogen-containing by-products distill off together with the oxidation compounds of the olefin and the water evaporated by the reaction heat. The preponderant portion of the said by-products, together with carboxylic acid and water, remains in the sump of that column in which the desired carbonyl compound is separated by distillation from the aqueous phase. The substances accumulating in the sump of the aforesaid column could be returned to the reaction zone, but in this case the preponderant part of the halogenated by-products would pass through the reactor without undergoing any reaction. Since new organic halogenation products are constantly formed in the reaction zone, these products concentrate to a constantly increasing extent in the sump of the column when the process is carried out in the aforesaid manner, and must finally be withdrawn from the process as waste products. In order to maintain the activity of the catalyst, a quantity of halogen atoms equivalent to that being constantly withdrawn from the catalyst by the process described must be continuously added to the catalyst in the form of hydrogen halide or hydrohalic acid. This is a considerable economical disadvantage of the process.

Now we have found a process for preparing aldehydes and ketones by oxidizing olefins with oxygen or oxygen-containing gases in the presence of water, noble metal salts capable of forming addition compounds or complexes with the olefin, and redox systems, in which process the catalyst liquid is regenerated by a thermal treatment. According to the process of the invention, the halogen-containing organic by-products and, if present, carboxylic acids and other halogen-free organic by-products remaining after separation of the aldehydes and ketones by distillation, are conducted in the presence of water to the regeneration zone of the catalyst where they are subjected, together with the catalyst liquid, to a thermal treatment which is carried out at the same temperature as, or at a higher temperature than, that prevailing in the zone in which the principal reaction takes place. The residence times in the regeneration zone are 10 to 10,000 times as long as those which are used in the principal reaction at the same temperature. In the thermal treatment, the halogen-containing organic by-products are burnt to carbon dioxide and hydrogen halide. If halogen-free by-products are present, they are burnt to carbon dioxide. The catalyst is then regenerated with the hydrogen halide which has been set free by the thermal treatment, practically no halogen ions being supplied from outside. According to a preferred mode of operating, the catalyst is regenerated continuously by conducting a certain portion, for example, 0.1 to 10%, of the total catalyst substance, which portion has suitably been freed previously to a large extent from carbonyl compounds, into a branch cycle. The aqueous phase containing the halogen-containing organic by-products is also continuously introduced into the same branch cycle.

If necessary, the by-product mixtures, freed from aldehydes or ketones, can be concentrated prior to regeneration by distilling off some of the water therein, for example.

It is of importance with respect to the realisation of the process according to the invention that the organic halogen-containing by-products which are formed in the principal reaction zone and which are stable under the conditions of temperature and residence time prevailing there, are destroyed in the regeneration stage. If the catalyst is regenerated at the same temperatures as prevail in the principal reaction zone, the residence times have to be considerably longer, namely about 10 to 10,000 times longer than the residence times that are maintained in the reaction zone in which the olefin is oxidized.

In order to enable the residence times which are maintained in the zone in which the catalyst is regenerated to be as short as possible, too, the temperatures used here are in general higher than the temperatures used in the principal reaction zone. The temperatures used in the catalyst regeneration zone are preferably 50° C. to 100° C. higher than those used in the principal reaction zone. If, for example, the principal reaction is preferably carried out at temperatures within the range of 100° to 130° C., the temperatures applied in the regeneration zone are suitably within the range of about 150° to 250° C. It is also desired that the residence times for the "wet" separation of by-products, which is carried out in combination with the regeneration of the catalyst, be short since then relatively small reaction chambers are sufficient.

If the aqueous phase of the principal reaction, in addition to halogen-containing by-products, contains carboxylic acids or other carbonyl compounds having a higher boiling point than the carbonyl compounds desired as the chief product, for example, unsaturated aldehydes, the said higher boiling carbonyl compounds are burnt in the catalyst regeneration zone to carbon dioxide which escapes in the form of gas.

When carrying out the process according to the invention, the concentration of halogenated by-products can practically be maintained at a definite value in the cycle water of the total system and it is not necessary to supply fresh water or hydrogen halide to the process. In the known processes, as has been stated above, the concentration of halogen-containing by-products constantly increases and an undersired formation of waste water takes place.

The concentration of halogenated by-products can be controlled, in particular, by returning only a certain portion of the aqueous phase containing the halogen-containing by-products continuously or discontinuously to the catalyst regeneration. The remaining portion is conducted in an unchanged state, likewise continuously or discontinuously, to the zone in which the chief reaction takes place.

The process according to the invention can be realized, for example, by adding the aqueous phase containing the halogen-containing compounds discontinuously or continuously at a temperature within the range of 160° to 250° C., preferably 180° to 220° C., to the catalyst to be regenerated and carrying out the thermal treatment under pressure. The metal salts of low valency which are present in the catalyst liquid to be regenerated can be oxidized by means of oxygen or oxygen-containing gases either during or after the thermal treatment.

If a particularly high content of halogen-containing by-products is present in the column in which the aldehydes and ketones are separated by distillation from the aqueous phase, fractions of this kind which are particularly rich in halogen may be drawn off at the lower part of the column and be conducted to the regeneration zone of the catalyst.

If halogen-containing by-products of a particularly low boiling point are formed in the course of the reaction, for example, methyl chloride, ethyl chloride, methylene chloride and/or ethylene chloride, these products do not stay in the aqueous phase when the aldehydes and ketones are isolated but they distill off together with the aldehydes and ketones. If an isolation of these readily volatile halogenation products is dispensed with, halogen has to be added in the form of hydrogen halide in a quantity which is equivalent to the quantity of halogen which is withdrawn from the reaction in the form of the readily volatile halogenation products which are distilled off. These quantities are in general very small. The aforesaid readily volatile halogenation products can also be separated from the mixture of the carbonyl compounds and can then be conducted to the regeneration zone either by dissolving them in the aqueous phase conducted in a cycle, or by introducing them under the pressure prevailing in the regeneration zone.

Another advantage of the process according to the invention is that by-products which do not contain halogen, for example, acetic acid and crotonaldehyde, need not be rejected but may be used as heating material in the regeneration zone and be transformed into carbon dioxide while producing heat.

With regard to the olefins which are oxidized to aldehydes and ketones according to the present invention, to the noble metal salts which are advantageously used, and to the appropriate redox systems the statements apply which have been made in the prior art, for example, in U.S. patent applications Ser. Nos. 747,115, filed July 8, 1958 and now abandoned; 747,116, filed July 8, 1958 and now Patent No. 3,154,586; 750,150, filed July 22, 1958 and now Patent No. 3,122,586; 760,539, filed September 12, 1958 and now Patent No. 3,057,915; 763,691, filed September 26, 1958 and now abandoned; 765,272, filed October 6, 1958 and now Patent No. 3,104,263; 768,624, filed October 21, 1958 and now abandoned; 791,816, filed February 9, 1959 and now abandoned, which correspond to Belgian Patent 571,902, and in U.S. patent applications Ser. Nos. 770,007, filed October 28, 1958 and now Patent No. 3,076,032; 770,019, filed October 28, 1958 and now Patent No. 3,106,579; 770,020, filed October 28, 1958 and now abandoned; 769,912, October 27, 1958 and now Patent No. 3,119,875; 769,554 filed October 27, 1958 and now abandoned; 848,531, filed October 26, 1959 and now abandoned; 803,096, filed March 31, 1959 and now abandoned; 806,205, filed April 14, 1959 and now Patent No. 3,121,673; 788,488 filed January 23, 1959 and now Patent No. 3,118,001; 843,783, filed October 1, 1959 and now abandoned; 853,453, filed November 17, 1959 and now abandoned; 855,975 filed November 30, 1959 and now Patent No. 3,119,874; 853,-454, filed November 17, 1959 and now Patent No. 3,087,-968; 858,073, filed December 8, 1959 and now abandoned; 861,197, filed December 22, 1959 and now Patent No. 3,236,897; 878, filed January 6, 1960 and now abandoned; 15,074, filed March 15, 1960 and now Patent No. 3,215,743; 57,907, filed September 23, 1960 and now Patent No. 3,149,167; 57,795, filed September 22, 1960. From the aforesaid specifications may also be gathered all the other necessary known details, for example, those concerning the discontinuous or continuous regeneration of the catalyst.

The following examples serve to illustrate the invention but they are not intended to limit it thereto.

*Example 1*

A reactor contained 500 liters of an aqueous catalyst comprising $\frac{1}{100}$ mol of $PdCl_2$, 1 mol of copper chloride, and 0.1 mol of acetic acid per liter of solution. Ethylene and oxygen were introduced into the reactor at a temperature of 120° C. under a pressure of 3 atmospheres. The reactants stayed in the reactor for about 3 seconds. The vapors leaving the reactor were separated in a distillation column, 70 kilograms per hour of chlorine-free acetaldehyde being distilled off at the head of the column. At the lower end of the column, 150 kilograms per hour of an aqueous phase were obtained which, in addition to 15 kilograms of acetic acid, contained 3 kilograms of chlorine in the form of chlorinated aldehydes. 135 kilograms per hour of the aqueous phase were returned to the reactor. 15 kilograms per hour of the aqueous phase, containing a total of 1.5 kilograms of acetic acid and 0.3 kilogram of organically bound chlorine, were passed under a pressure of 30 atmospheres (gauge) and at a temperature of 210° C. through a tantalum tube of a capacity of 5 liters together with 15 liters of catalyst substantially comprising water, $PdCl_2$, and $CuCl$, as well as with an amount of air sufficient to convert all monovalent copper present into bivalent copper. The time of sojourn in the tantalum tube was about 300 seconds.

After this treatment, the catalyst was practically free from organically bound chlorine, and the nitrogen that passed off contained carbon dioxide but no hydrogen chloride. The catalyst was returned to the principal reactor. When operating in this manner, only such a quantity of hydrochloric acid need be added from outside as is lost in the form of readily volatile chlorine-containing compounds distilling over together with acetaldehyde, for example, methyl chloride. In this experiment 100 cc. of hydrochloric acid of 30% strength had to be added per 100 kilograms of acetaldehyde.

If the methyl chloride which is formed is also introduced into the tantalum tube to be regenerated, practically no hydrochloric acid need be added. If the process does not comprise a regeneration stage for the aqueous phase containing chlorine compounds, but is carried out under conditions which in the other respects are the same as those of the above experiment, 1 kilogram of hydrochloric acid of 30% strength has to be added from outside per 100 kilograms of acetaldehyde.

*Example 2*

1 liter of water, 170 grams of $CuCl_2 \cdot 2H_2O$ and 1 gram of $PdCl_2$ were heated for 1 hour to 200° C. together with 10 grams of chloracetaldehyde. After this period no organic carbon could be detected in the aqueous phase. The chlorine could be detected quantitatively in the form of chlorine ions.

We claim:

1. In a process for the preparation of carbonyl compounds selected from the group consisting of aldehydes and ketones by contacting, in a reaction zone, an olefin, oxygen, and an aqueous liquid catalyst of a salt of a noble metal of Group VIII of the Periodic Table and, as a redox system, a salt of a metal capable of forming several valence states under the reaction conditions applied, at least a portion of said metal salts being selected from the group consisting of metal chlorides and metal bromides, whereby an aqueous reaction product is formed comprising said carbonyl compounds together with volatile and involatile halogen-containing by-products containing halogen selected from the group consisting of chlorine and bromine derived from said metal chlorides and bromides, and then distilling said aqueous reaction product to separate said carbonyl compounds therefrom together with said volatile halogen-containing by-products to leave an aqueous phase comprising said involatile halogen-containing by-products, the improvement which comprises combining at least a portion of said aqueous phase containing said involatile halogen-containing by-products, after removal of said carbonyl compounds and volatile halogen-containing by-products therefrom, with at least a portion of said liquid aqueous catalyst from said reaction zone, heating the combination under pressure in a regeneration zone in the presence of air at a temperature between 160° C.–250° C. until said involatile halogen-containing by-products are converted to carbon dioxide, water, and hydrogen halides selected from the group consisting of hydrogen chloride and hydrogen bromide, whereby halide ions are resupplied to said catalyst, and until metal ions of said redox system present in said catalyst in lower valence states are completely oxidized to higher valence states, and returning the catalyst to said reaction zone, additional halide ion being added to said catalyst in the form of a member of the group consisting of hydrogen chloride and hydrogen bromide in an amount equivalent to the halide ion removed in the form of said volatile halogen-containing by-products.

2. A process as in claim 1 wherein said aqueous phase comprising said involatile halogen-containing by-products is continuously conducted to said regeneration zone.

3. A process as in claim 1 wherein said aqueous phase containing said involatile halogen-containing by-products is concentrated by removal of water therefrom before being conducted to said regeneration zone.

4. A process as in claim 1 wherein only a portion of said aqueous phase containing said involatile halogen-containing by-products is conducted to said regeneration zone, the remaining portion of said aqueous phase being returned to said reaction zone.

5. A process as in claim 1 wherein the temperature within said regeneration zone is between 180° C. and 250° C.

6. A process as in claim 1 wherein the temperature in the reaction zone is equal to the temperature in the regeneration zone and the residence time of the aqueous phase in said regeneration zone is from 10 to 10,000 times greater than the residence time of the reactants in said reaction zone.

7. A process as in claim 1 wherein said separated carbonyl compounds are further treated to separate said volatile halogen-containing by-products therefrom, and wherein the halogen-containing volatile by-products so separated are also conducted to said regeneration zone.

8. A process as in claim 1 wherein said catalyst is continuously returned to said reaction zone.

9. A process as in claim 1 wherein said aqueous phase remaining after distillative separation of carbonyl compounds from said aqueous reaction product additionally comprises halogen-free by-products together with said involatile halogen-containing by-products, said halogen-free by-products also being combined with said catalyst and heated until they are converted to carbon dioxide and water.

10. A process as in claim 9 wherein said halogen-free by-products are carboxylic acids.

References Cited by the Examiner

UNITED STATES PATENTS

| | | |
|---|---|---|
| 3,057,915 | 10/1962 | Riemenschneider et al. 260—604 |
| 3,122,586 | 2/1964 | Berndt et al. 260—604 |
| 3,154,586 | 10/1964 | Bander et al. 260—604 |

LEON ZITVER, *Primary Examiner.*

J. J. SETELIK, B. HELFIN, *Assistant Examiners.*